(12) United States Patent
Moore et al.

(10) Patent No.: US 12,455,455 B2
(45) Date of Patent: Oct. 28, 2025

(54) LIGHTGUIDE INTEGRITY MONITORING IN A HEAD MOUNTED DISPLAY

(71) Applicant: GOOGLE LLC, Mountain View, CA (US)

(72) Inventors: Josh Moore, Elora (CA); Kaveh Moussakhani, Toronto (CA); Jaehong Choi, Waterloo (CA); Daniel Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/730,091

(22) PCT Filed: Sep. 14, 2022

(86) PCT No.: PCT/US2022/043429
§ 371 (c)(1),
(2) Date: Jul. 18, 2024

(87) PCT Pub. No.: WO2023/140897
PCT Pub. Date: Jul. 27, 2023

(65) Prior Publication Data
US 2025/0147313 A1 May 8, 2025

Related U.S. Application Data

(60) Provisional application No. 63/300,491, filed on Jan. 18, 2022.

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0081* (2013.01); *G02B 27/017* (2013.01);
(Continued)

(58) Field of Classification Search
CPC ............. G02B 27/017; G02B 27/0172; G02B 27/0081; G02B 2027/014;
(Continued)

(56) References Cited

U.S. PATENT DOCUMENTS

2018/0198215 A1 7/2018 Mandeville et al.
2019/0033698 A1 1/2019 Xu
(Continued)

OTHER PUBLICATIONS

International Search Report and Written Opinion mailed Dec. 14, 2022 for corresponding International Application No. PCT/US2022/043429, 13 pages.
(Continued)

*Primary Examiner* — Cory A Almeida (57) ABSTRACT

Lightguide integrity monitoring in a head mounted display is facilitated by monitoring an elongated conductor disposed proximal a lightguide in an optical combiner. When a sufficient change in one or more electrical characteristics of the elongated conductor is detected, a signal indicating that the lightguide has been damaged may be generated, which may alert the user to the damage or disable one or more light sources in the HMD to prevent eye discomfort. The monitored electrical characteristics of the elongated conductor may include connectivity, impedance, and gain, among others. A sufficient change in the one or more electrical characteristics may be detected based on a percentage change in an electrical characteristic, a change in more than one electrical characteristic, or a change in a ratio of two electrical characteristics, among others.

20 Claims, 4 Drawing Sheets

(51) Int. Cl.
  *G02C 11/00*   (2006.01)
  *G08B 21/18*   (2006.01)
  *H01Q 1/24*    (2006.01)
  *H01Q 1/27*    (2006.01)

(52) U.S. Cl.
  CPC ............ G02C 11/10 (2013.01); G08B 21/182 (2013.01); *G02B 2027/014* (2013.01); *G02B 2027/0141* (2013.01); *G02B 2027/0178* (2013.01); *H01Q 1/243* (2013.01); *H01Q 1/273* (2013.01)

(58) Field of Classification Search
  CPC .... G02B 2027/0141; G02B 2027/0178; G02C 11/10; G08B 21/182; H01Q 1/243; H01Q 1/273
  See application file for complete search history.

(56) References Cited

U.S. PATENT DOCUMENTS

| | | |
|---|---|---|
| 2021/0102904 A1 | 4/2021 | Sappok et al. |
| 2021/0109353 A1 | 4/2021 | Nicholson et al. |
| 2021/0157140 A1* | 5/2021 | Potnis .................. G02B 27/017 |

OTHER PUBLICATIONS

Morita, K. et al., "Crack detection methods using radio frequency identification and electrically conductive materials", The 14th World Conference on Earthquake Engineering, Beijing, China; Oct. 12-17, 2008; downloaded from <<https://www.iitk.ac.in/nicee/wcee/article/14_11-0051.PDF>>; 7 pages.
International Preliminary Report on Patentability mailed Aug. 2, 2024 for PCT/US2022/043429, 8 pages.

* cited by examiner

LIGHTGUIDE INTEGRITY MONITORING IN A HEAD MOUNTED DISPLAY

CROSS-REFERENCE TO RELATED APPLICATIONS

The present application is a U.S. National Stage under 35 U.S.C. § 371 of International Patent Application Serial No. PCT/US2022/043429, entitled "LIGHTGUIDE INTEGRITY MONITORING IN A HEAD MOUNTED DISPLAY" and filed on Sep. 14, 2022, which claims priority to U.S. Provisional Application No. 63/300,491, entitled "LIGHTGUIDE INTEGRITY MONITORING IN A HEAD MOUNTED DISPLAY" and filed on Jan. 18, 2022, the entireties of which are incorporated by reference herein.

BACKGROUND

Head mounted displays (HMDs), also known as near-eye displays, often utilize various optical elements to transport light from a display light source, such as a laser or other high-intensity display, to the user's eye. Such optical elements often include an optical combiner implementing an incoupler, a lightguide (which may comprise a waveguide), and an outcoupler, with the incoupler proximate to the light source and configured to facilitate the input of display light from the light source into the lightguide, the outcoupler proximate to the user's eye and configured to facilitate the output of display light from the lightguide toward the user's eye, and the lightguide configured to transport display light input by the incoupler to the outcoupler for output.

Such optical combiners may be implemented in an ophthalmic lens in an eyeglass frame or similar configuration that can expose the optical elements to damage, including fracture of the medium in which the optical elements are implemented. Such cracks and other damage have the potential for causing unintended and concentrated emissions of the display light toward the user's or a bystander's eye, which may cause discomfort.

BRIEF DESCRIPTION OF THE DRAWINGS

The present disclosure can be better understood, and its numerous features and advantages made apparent to those skilled in the art by referencing the accompanying drawings. The use of the same reference symbols in different drawings indicates similar or identical items.

DETAILED DESCRIPTION

Conventional near-eye displays can project significant amounts of light into a user's eye through one or more lenses, incouplers, lightguides, and outcouplers in an optical combiner. However, when a lens or other optical element implementing a combiner sustains damage, such as cracking or other fracturing that may result from dropping a HMD, light projected by the near-eye display can be reflected and refracted in unpredictable and often undesirable manners. For example, as a result of a break in an optical combiner, laser light from a light source may be inadvertently redirected from an intended pathway along a lightguide in the combiner directly into the user's eye, which can cause discomfort. Such a break in an optical combiner can also disrupt a displayed image, resulting in a poor user experience. Areas of the combiner proximal to certain elements of a lightguide, such as incouplers and exit-pupil expanders, may be particularly susceptible to this type of reflection and refraction when damaged, as more concentrated light may be conveyed through these areas than other areas of the combiner.

Using the systems and techniques described herein, a lens or other optical element implementing an optical combiner for an HMD employs an elongated conductor disposed proximal to one or more elements of the optical combiner, and the HMD monitors for fractures or other damage to the optical combiner by monitoring one or more electrical characteristics of the elongated conductor. The HMD can detect damage to the combiner directly based on a sufficient change in one or more electrical characteristics or inferred from a combined change in two or more electrical characteristics of the elongated conductor. When the HMD detects a sufficient change in one or more electrical characteristics, the HMD generates a signal indicating that the lightguide has been damaged, which may alert the user to the damage and/or disable one or more light sources in the HMD to prevent undesirable operation of the HMD.

It should be noted that although the optical systems of the present disclosure are described and illustrated with reference to a particular example near-eye display system in the form of a wearable HMD, it will be appreciated that the apparatuses and techniques of the present disclosure are not limited to this particular example, but instead may be implemented in any of a variety of display systems using the guidelines provided herein.

Figure 1:
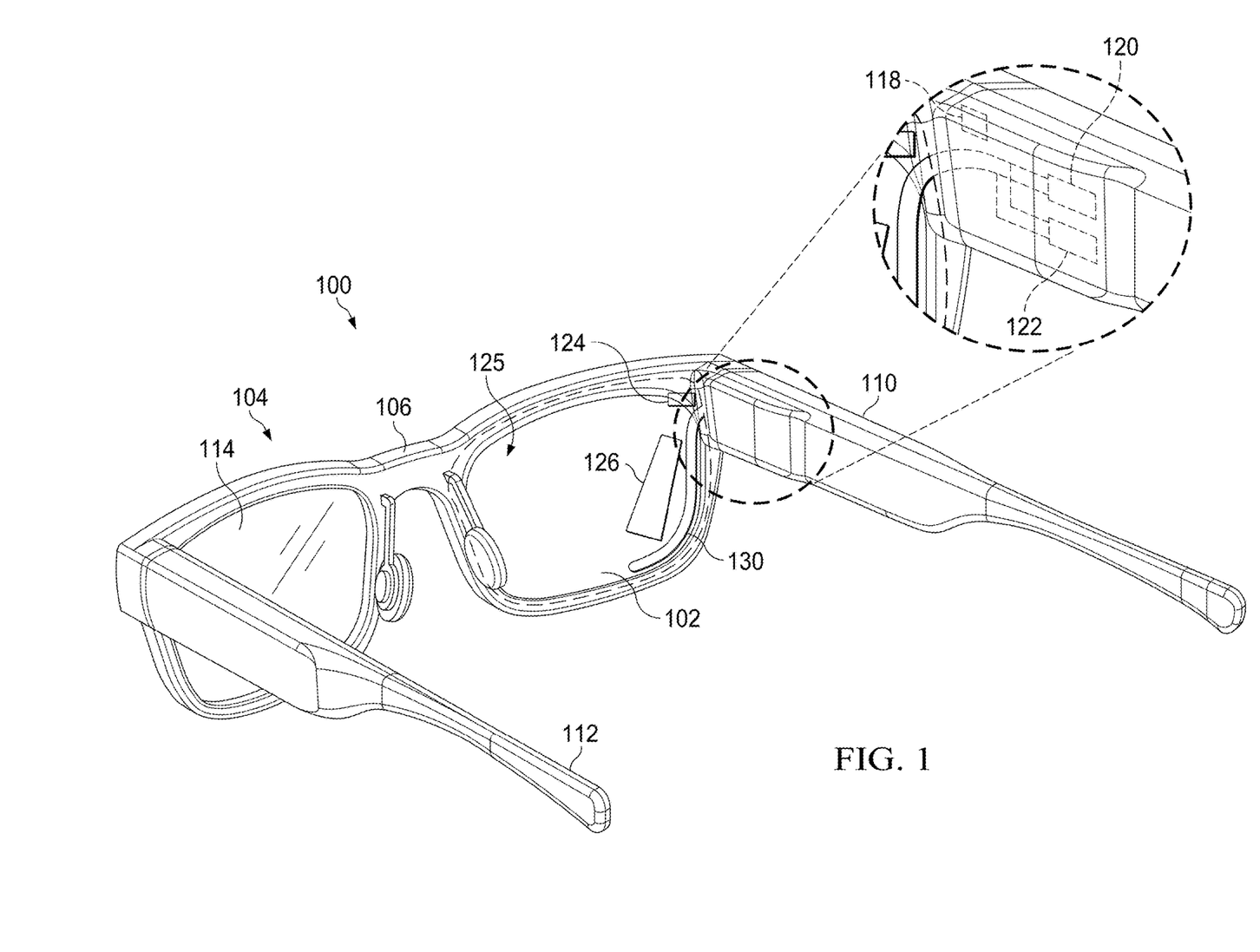
FIG. 1 illustrates an HMD that supports lightguide integrity monitoring in accordance with some embodiments.

FIG. 1 illustrates an example display system 100 employing an optical combiner 102 (hereinafter, "combiner 102" for brevity purposes) in accordance with some embodiments having a support structure 104 that includes a frame 106, which houses a light source configured to project images toward the eye of a user, such that the user perceives the projected images as being displayed in a field of view area at the combiner 102. The support structure 104 also includes components to allow a user to wear the support structure 104 in a position in front of their eyes. Examples of such components are arms 110 and 112 that may rest on a user's ears. A strap, or straps (not shown), configured for a user to wear around and/or on top of their head may be used in place of one or more of the arms in some embodiments to secure the support structure 104 in front of a user's eyes. In some embodiments, the display system 100 is symmetrically configured such that a lens element 114 is also a combiner and a light source is housed in the portion of the frame 106 proximate to the arm 112 to project images to a field of view area within the lens element 114.

In the depicted example, the display system 100 is a near-eye display system in the form of an HMD in which the support structure 104 is configured to be worn on the head of a user and has a general shape and appearance (or "form factor") of an eyeglasses frame. The support structure 104 contains or otherwise includes various components to facilitate the projection of such images toward the eye of the user, such as a light source 118 and a controller 120, which are described in greater detail below with reference to FIG. 2. In some embodiments, the support structure 104 further includes various sensors, such as one or more front-facing cameras, rear-facing cameras, other light sensors, motion sensors, accelerometers, and the like. The support structure 104 further can include one or more radio frequency (RF) interfaces 122 or other wireless interfaces, such as a Bluetooth™ interface, a WiFi interface, which may operate at 2.4 gigahertz or higher frequency bands, and the like. Further, in some embodiments, the support structure 104 further includes one or more batteries or other portable power sources for supplying power to the electrical and processing components, such as the controller 120, of the display system 100. In some embodiments, some or all of these components of the display system 100 are fully or partially contained within an inner volume of the support structure 104, such as within the arm 110 and a portion of the frame adjacent the arm 110 in the support structure 104. It should be noted that while an example form factor is depicted, it will be appreciated that in other embodiments the display system 100 may have a different shape and appearance from the eyeglasses frame depicted in FIG. 1.

In the depicted embodiment, the combiner 102 is used by the display system 100 to provide an AR display in which rendered graphical content can be superimposed over or otherwise provided in conjunction with a real-world view as perceived by the user through the combiner 102. For example, the light source 118 of the display system 100 may project light used to form a perceptible image or series of images onto the eye of the user via a series of optical elements, such as an incoupler, lightguide, and outcoupler formed at least partially in the combiner 102 and one or more lenses and/or filters disposed between the light source and the lightguide, as is described further below. The combiner 102 includes a lightguide 125 that routes display light received by an incoupler 124 of the lightguide 125 to an outcoupler (not shown) of the lightguide 125, which outputs the display light toward an eye of a user (not shown) of the display system 100. In some embodiments, the combiner 102 further includes an exit-pupil expander 126 as part of the lightguide 125. In addition, the combiner 102 is sufficiently transparent to allow a user to see through the combiner 102 to provide a field of view of the user's real-world environment such that the image appears superimposed over at least a portion of the real-world environment.

In some embodiments, the light source 118 is a reflective display, such as a scanning laser projector or a combination of a modulative light source and a dynamic reflector mechanism or digital light processor. In some embodiments, the light source 118 is a transmissive display, such as a light-emitting diode (LED) or organic light-emitting diode (OLED) micro-display. When the light source 118 is capable of generating high-intensity light, a break in the combiner 102 can cause light from the light source 118 to deviate from an intended pathway along the lightguide 125 in the combiner 102 directly into the user's eye, potentially causing eye discomfort. Areas of the combiner 102 proximal to certain elements of the lightguide 125, such the incoupler 124 and the exit-pupil expander 126, may be particularly susceptible to reflection and refraction when damaged, as more concentrated light may be conveyed through these areas than other areas of the combiner.

In order to facilitate lightguide integrity monitoring so as to avoid potential discomfort to the user's eye and/or to alert the user to a damaged lens, the display system 100 employs a monitoring process that utilizes an elongated conductor 130 implemented in or at the combiner 102 proximal to the incoupler 124 and/or the exit-pupil expander 126. By monitoring the elongated conductor 130 for a change in one or more electrical characteristics using the controller 120, as described below in connection with FIG. 2, the controller 120 can detect damage to the combiner 102, particularly if the damage occurs near or through the incoupler 124 or the exit-pupil expander 126, such as may occur if the display system 100 is dropped and the combiner 102 is cracked. When the combiner 102 sustains damage in the area of the elongated conductor 130 and the damage affects a portion of the elongated conductor 130, changes in one or more electrical characteristics of the elongated conductor 130 may occur. For example, a complete break in the elongated conductor 130 results in a change in the electrical connectivity of the elongated conductor 130. As another example, even slight damage to the elongated conductor 130 without a complete break may result in the elongated conductor 130 exhibiting increased impedance and/or sporadic changes in electrical connectivity.

If the controller 120 detects sufficient damage through a sufficient change in the one or more electrical characteristics of the elongated conductor 130, the controller may generate a signal indicating that the lightguide 125 has been damaged, which in turn may disable the light source 118 and/or trigger an alert to the user. Thus, by monitoring the elongated conductor 130 for damage and generating a signal indicating that the lightguide 125 has been damaged and one or both of disabling the light source 118 or alerting the user when the controller 120 detects damage, systems and techniques described herein can prevent high levels of refracted light from being released and potentially entering a user's eye.

In the depicted example, the elongated conductor 130 forms a loop with its ends connected to one or more of the controller 120 and the RF interface 122. The elongated conductor 130 extends along a lower edge of the combiner 102 from a point adjacent to the incoupler 124 of the lightguide 125 to a point adjacent to the exit-pupil expander 126. However, as described below in connection with FIG. 4, the elongated conductor 130 may take other shapes and may extend a shorter distance, such as only along the combiner 102 adjacent to the incoupler 124, or a longer distance, such as around the entire perimeter of the combiner. In other embodiments, rather than the loop of the elongated conductor 130 comprising parallel conductors, the loop may comprise a single conductor that extends around the perimeter of the combiner 102 or in any other desired shape.

Figure 2:
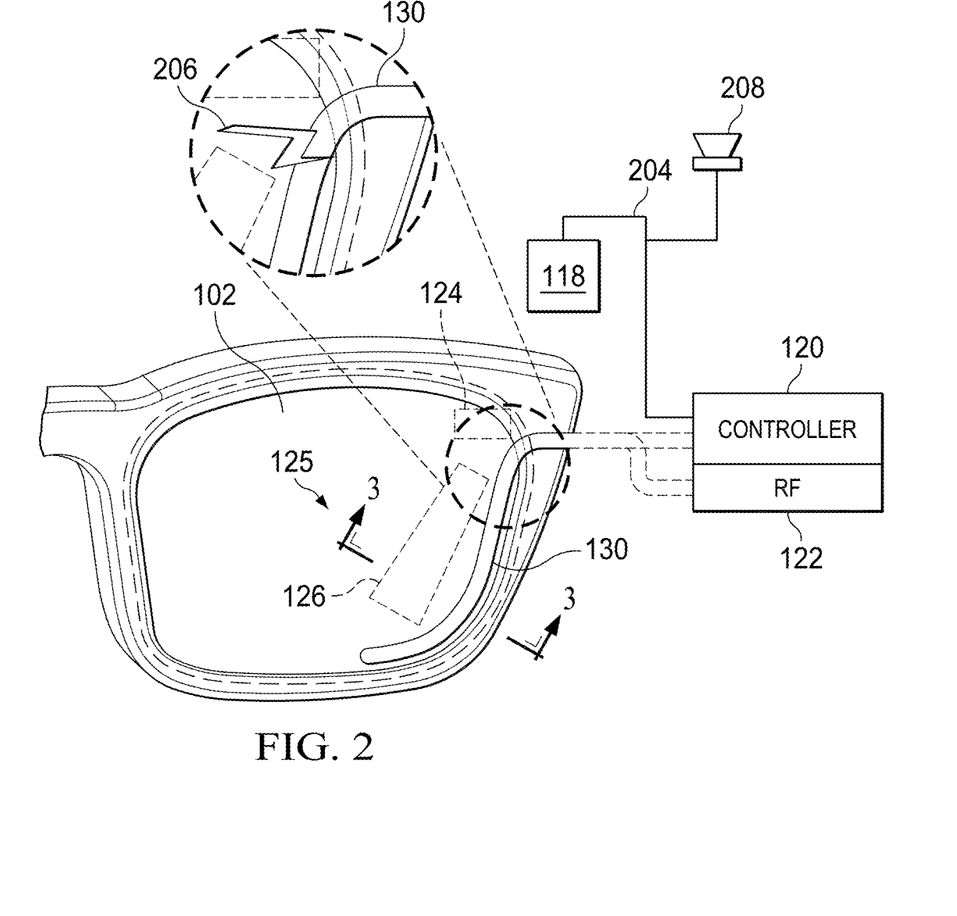
FIG. 2 illustrates a lightguide and corresponding monitoring system of the HMD of FIG. 1 in accordance with some embodiments.

FIG. 2 illustrates an enlarged front view of the combiner 102 of FIG. 1 along with representative interconnections shown between the controller 120, the RF interface 122, the light source 118, and the elongated conductor 130. The lightguide 125 comprising the incoupler 124 and/or the exit-pupil expander 126 is configured to act upon light traveling within it to change at least one of the direction that the light is traveling, the polarization state of the light, and the angle at which light is refracted or reflected. These changes facilitate conveyance of light within the lightguide 125 to an outcoupler feature (not shown for ease of illustration), where the outcoupler directs light out of the lightguide 125 towards a user's eye. The lightguide 125 is positioned within the combiner 102 to receive display light from the light source 118 mounted the frame 106. The light source 118 is connected to one or more computing components such as the controller 120 responsible for providing computer-generated content to light source. In some embodiments, computer-generated content includes video content, images, or text intended for a user to view by wearing the display system 100. The incoupler 124 transmits light into the lightguide 125 as display light.

In order to present an image for viewing by a user, the light source 118 may direct light through one or more lenses onto the incoupler 124. The incoupler 124 directs the light into the lightguide 125 of the combiner 102 as display light, which the lightguide 125 then conveys via total internal reflection (TIR) to the outcoupler feature of the combiner 102, optionally via an exit-pupil expander 126 to enable a larger projected area size. The outcoupler feature is configured to reflect the display light at an angle less than the critical angle so that the outcoupler directs display light out of the combiner 102 towards a user's eye. The combination of display light reflected from the outcoupler feature and environmental light transmitted through the combiner 102 may create an AR scene viewable by the user. In general, the terms "incoupler," "exit-pupil expander," and "outcoupler" will be understood to refer to any type of optical structure, including, but not limited to, diffraction gratings, holograms, holographic optical elements (e.g., optical elements using one or more holograms), volume diffraction gratings, volume holograms, surface relief diffraction gratings, surface relief holograms, or reflective waveguides. In some embodiments, a given incoupler, exit-pupil expander, or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler, exit-pupil expander, or outcoupler is a reflective grating (e.g., a reflective diffraction grating or a reflective holographic grating) that causes the incoupler, exit-pupil expander, or outcoupler to reflect light and to apply designed optical function(s) to the light during the reflection.

As shown in FIG. 2, the controller 120 and/or the RF interface 122 may be connected to the elongated conductor 130 for lightguide integrity monitoring and/or RF communication purposes. The controller 120 may directly control the RF interface 122 or one or more other processors may be included in the display system 100 to direct operations of one or more of the controller 120 and the RF interface 122. In some embodiments, the RF interface 122 implements aspects of the controller 120 or the controller 120 implements aspects of the RF interface 122. Generally, the controller 120 comprises hardware and/or software configured to monitor one or more electrical characteristics of the elongated conductor 130 and, after detecting a sufficient change in the one or more electrical characteristics, generate a signal 204 indicating that the lightguide 125 has been damaged and/or disable the light source 118 to prevent discomfort to a user's eye.

In one implementation, the controller 120 may monitor the elongated conductor 130 for a change in connectivity as the electrical characteristic, as any complete break in the loop of the elongated conductor 130 would indicate a possible crack in combiner 102, such as the crack 206 shown in FIG. 2, or other damage to the combiner 102. In other implementations, the controller 120 may monitor an impedance and/or a gain of the elongated conductor 130 as the one or more monitored electrical characteristics. For example, the controller 120 can employ a fixed-voltage circuit that applies a fixed voltage across the loop implemented by the elongated conductor 130, and then measure for a change in impedance in the loop by monitoring for a change in the current passing through the loop from the application of the fixed voltage. Conversely, the controller 120 can employ a fixed-current circuit that provides a constant current to the loop, and further employs a voltage monitoring circuit to monitor for a change in impedance in the loop by way of detecting a change in the voltage across the loop. As yet another example, in embodiments where the RF interface 122 is configured to transmit or receive information using the elongated conductor 130 as an antenna, any break in the elongated conductor 130 may change the gain of the antenna, and the controller 120 may detect a change in the gain of the antenna as the electrical characteristic.

Accordingly, in some embodiments, a sufficient change in an electrical characteristic of the elongated conductor 130 may comprise any detectable change in the monitored one or more characteristics. In other embodiments a sufficient change may be determined based on a percentage of change, such as a percentage of detected gain loss, such as 10% or more or 25% or more, when the elongated conductor is used as an antenna, or determined based on comparison of the magnitude of detected change in the electrical characteristic with one or more thresholds, such as a minimum impedance change threshold, so as to allow for variances in the monitoring circuitry and changes in ambient conditions (e.g., changing temperature of the lens) that are not indicative of damage to the monitored optical components and do not exceed the threshold.

In some embodiments, the controller 120 may monitor the elongated conductor 130 for a sufficient change in a single electrical characteristic, but in other embodiments, the controller 120 monitors the elongated conductor 130 for sufficient changes in two or more electrical characteristics. In embodiments where the controller 120 monitors multiple electrical characteristics of the elongated conductor 130 for changes, the controller 120 may apply one or more rules, equations, or other algorithms to determine when the controller 120 will detect sufficient changes in the electrical characteristics when the changes satisfy one or more of the rules, equations, or other algorithms. For example, the controller 120 may always identify a change in connectivity of the elongated conductor 130 as a sufficient change in the electrical characteristics, while changes in impedance or gain of the elongated conductor may require more specific conditions to be considered a sufficient change for the purposes of identifying damage to the lightguide 125 of the combiner 102. For example, the controller 120 may not identify a change in impedance as a sufficient change unless the controller 120 detects a corresponding change in gain. As another example, the controller 120 may compare a change in gain of the elongated conductor 130 to a change in impedance and only identify a sufficient change in the electrical characteristics when the controller 120 detects a particular ratio of gain change to impedance change. In some embodiments, the controller 120 may detect a sufficient change based on a predetermined level of change in one or more electrical characteristics of the elongated conductor 130 (such as a 10 decibels or 20 decibels change in gain). Generally, the controller 120 should detect a sufficient change in one or more of the monitored electrical characteristics of the elongated conductor 130 when the electrical characteristics strongly indicate that damage has likely occurred to the lightguide 125 in order to avoid false positives, where a change in the gain of the elongated conductor may be caused by environmental factors other than a break in the combiner. To this end, the controller 120 may calculate a confidence level of damage to the combiner 102 based on one or more changes in electrical characteristics of the elongated conductor 130 and react in a progressive manner to increases in the confidence level. For example, if the controller 120 detects a slight reduction in gain of the elongated conductor 130, it may merely reduce the power of the light source 118 and/or cause the light source to project a predetermined color or an error message on the display system 100, while if the controller detects a more significant reduction in gain or a change in connectivity of the elongated conductor, the controller may deactivate the light source.

As noted above, when the controller 120 detects a sufficient change in the one or more electrical characteristics of the elongated conductor 130, it may generate a signal 204 indicating the lightguide 125 has been damaged and/or disable the light source 118 to prevent discomfort to a user's eye. However, in some embodiments, rather than, or in addition to, disabling the light source 118 upon detecting sufficient change in the one or more electrical characteristics of the elongated conductor 130, the controller 120 may generate a signal (either the signal 204 or an additional signal) that causes a speaker 208 within the display system 100 to produce a warning sound, causes the light source 118 to project an error message into the incoupler 124, and/or causes the light source to operate at minimum power. In some embodiments, upon detecting sufficient change in the one or more monitored electrical characteristics of the elongated conductor 130, the controller 120 may activate the RF interface 122 to notify the user or a third party that damage to the lightguide 125 of the combiner 102 has been detected through one or more other devices, such as one or more base stations for the display system 100 or one or more other devices, such as tablets, laptops, mobile phones, smart watches, or other devices configured to receive RF transmissions from the RF interface 122. In some embodiments, to hedge against false positives and enable the display system 100 to return to operation immediately after any damage to the combiner 102 is repaired, the controller 120 may continue to monitor the elongated conductor 130 for changes in electrical characteristics after the controller detects a sufficient change in the electrical characteristics so that any action taken by the controller in response to detecting the sufficient change (e.g., deactivating the light source 118 or displaying an error message) can be reversed if the electrical characteristics revert to an acceptable state.

Figure 3:
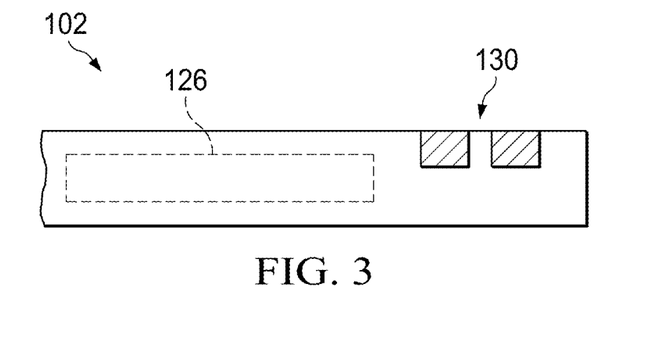
FIG. 3 illustrates a cross-section of the lightguide of FIG. 2 in accordance with some embodiments.

FIG. 3 illustrates a cross-sectional view of a portion of the combiner 102 showing one way in which the elongated conductor 130 may be incorporated into the combiner adjacent to the exit-pupil expander 126. In the depicted example, the elongated conductor 130 has been applied directly to the combiner 102 using lithography or plating deposition. However, in other embodiments, the elongated conductor 130 may be applied to the combiner 102 using any appropriate manufacturing method, such as 3D printing, pressure sensitive tape, and so on. In some embodiments, the elongated conductor 130 may comprise a substantially transparent indium tin oxide (ITO) trace or film, while in other embodiments a copper trace may be used, particularly when the elongated conductor 130 is arranged on the combiner 102 such that it is hidden from view when the combiner is inserted into the frame 106.

In some embodiments, rather than being disposed on a surface of the combiner 102, as shown in FIG. 3, the elongated conductor 130 is disposed within the combiner 102 such that the elongated conductor 130 is completely contained within the combiner 102 along the length of the elongated conductor 130. Locating the elongated conductor 130 on or near to a surface of the combiner 102 can be useful for detecting scratches that may be deep enough in the combiner 102 to potentially affect functionality of the lightguide 125. However, locating the elongated conductor 130 within the combiner can increase the robustness of the display system 100 by reducing the possibility of false positives, wherein the controller 120 may interpret a small scratch on the combiner 102 that happens to damage the elongated conductor 130 as resulting in a sufficient change in electrical characteristics of the elongated conductor 130 to detect damage to the lightguide 125 even if the lightguide 125 is not, in fact, damaged. Thus, locating the elongated conductor 130 at or near a surface of the combiner 102 may increase sensitivity to scratch damage at the expense of robustness, while locating the elongated conductor within the combiner 102 may increase robustness at the expense of sensitivity to scratch damage.

In some embodiments, in order to avoid false positives, a plurality of elongated conductors is used in the combiner 102, optionally with one or more disposed at a surface level of the combiner 102 like elongated conductor 130 and one or more contained within the combiner 102. Further, in some embodiments, the elongated conductor 130 is disposed within the combiner 102 such that one or more portions are at a surface level of the combiner 102, such as in areas of the combiner proximal the incoupler 124, the lightguide 125, the exit-pupil expander 126, and/or one or more outcouplers, and one or more portions are contained within the combiner 102. In this way, sensitivity to scratch damage can be maintained in certain regions that may convey higher intensity light while the elongated conductor 130 is protected from scratch damage in other regions.

Figure 4:
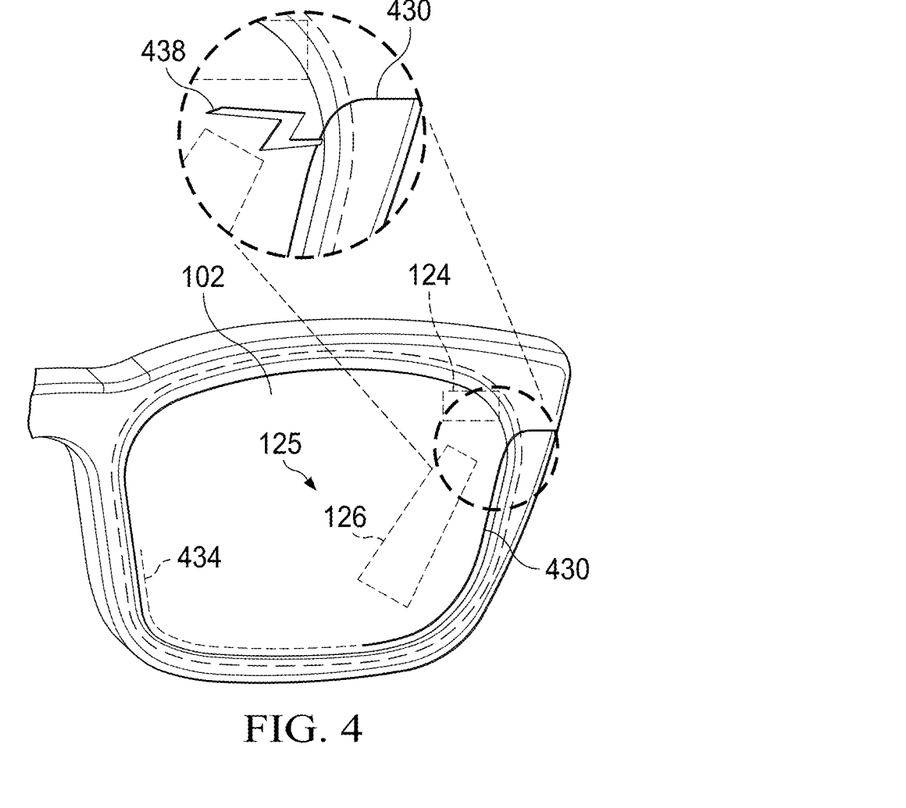
FIG. 4 illustrates an alternative configuration of the lightguide of the HMD of FIG. 1 in accordance with some embodiments.

FIG. 4 illustrates an alternative embodiment with a single-ended elongated conductor 430 in place of the looped, or double-ended, embodiment of the elongated conductor 130 of FIGS. 1 and 2. As shown, in some embodiments, the elongated conductor 430 extends beyond the exit-pupil expander 126 along an extended path 434. Although the elongated conductor 430 is shown as extending along a lower perimeter of the combiner 302 and an outer periphery of the lightguide 125 in the depicted example, as explained above with reference to the elongated conductor 130 of FIGS. 1 and 2, the elongated conductor 430 may have any desired length or shape. In embodiments where a single-ended elongated conductor like elongated conductor 430 is used in place of a looped conductor, the controller 120 may monitor gain and/or impedance characteristics of the conductor as the one or more monitored electrical characteristics, and so the elongated conductor should be of sufficient length to facilitate appropriate detection of such changes.

For example, as shown in FIG. 4, a crack 438 in the combiner 102 may propagate from an edge of the combiner through an area adjacent to one or more of the incoupler 124 and the exit-pupil expander 126. In this case, in order to detect a change in the gain of the elongated conductor 430 when it is used as an antenna, such as a monopole antenna, the elongated conductor 430 should extend beyond the crack 438 a sufficient distance such that the crack 438 will cause a detectable change in the gain characteristics of the elongated conductor 430 in its operation as an RF antenna. For example, in some embodiments, the elongated conductor 430 extends at least 150% of the distance from the edge of the combiner 102 along the perimeter of the combiner to the incoupler 124 to ensure that the elongated conductor 430 extends a sufficient distance beyond the incoupler 124 such that a crack near the incoupler 124 will cause a detectable change in the gain characteristics of the elongated conductor 430 in its operation as an RF antenna. In other embodiments, the elongated conductor 430 extends at least 150% of the distance from the edge of the combiner 102 along the perimeter of the combiner to a location proximal an end of the exit-pupil expander 126 to ensure that the elongated conductor 430 extends a sufficient distance beyond the exit-pupil expander 126 such that a crack between the incoupler 124 and exit-pupil expander 126 will cause a detectable change in the gain characteristics of the elongated conductor 430 in its operation as an RF antenna, in which case the elongated conductor 430 may be extended along the extended path 434. In some embodiments, the elongated conductor 430 extends at least 200%, at least 250%, or at least 300% of one of the aforementioned distances in order to increase the likelihood of a crack in the elongated conductor 430 between the incoupler 124 and the exit-pupil expander 126 resulting in a detectable change in the gain characteristics of the elongated conductor 430 in its operation as an RF antenna.

Figure 5:
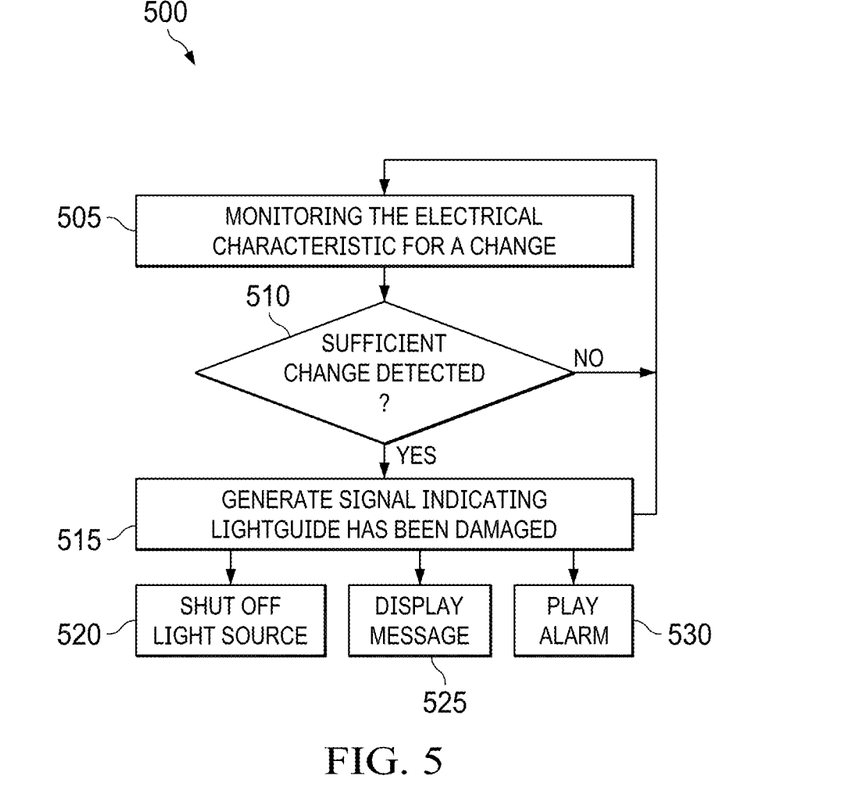
FIG. 5 illustrates a method for monitoring lightguide integrity in a head mounted display in accordance with some embodiments.

FIG. 5 is a block diagram of a method 500 of monitoring lightguide integrity in a HMD, such as the display system 100 in accordance with some embodiments. At block 505, the controller 120 may monitor the elongated conductor, such as the elongated conductor 130 or the elongated conductor 430, for a change in an electrical characteristic. As described above, the change in a monitored electrical characteristic can be a change in connectivity, a change in impedance, a change in gain, or any other change that could indicate a break in a combiner such as the combiner 102 or the combiner 302.

At block 510, the controller 120 may determine whether a sufficient change in the electrical characteristic has been detected. As described above, a sufficient change may involve any detectable change in a monitored electrical characteristic, such as a detectable change in connectivity from connected to unconnected, as may be used with a looped elongated conductor like the elongated conductor 130, a threshold change in a monitored electrical characteristic, a percentage or other proportional change in one or more monitored electrical characteristics, such as gain or impedance, a change in a ratio of one or more electrical characteristics, or a change in a ratio of one or more changes in electrical characteristics, among others. In some embodiments, the changes in electrical characteristics must meet a predetermined threshold of change in order for the controller 120 to consider the change to be sufficient for the purposes of identifying damage to the combiner 102. If the controller 120 does not detect any change, the method may proceed back to block 505 to continue monitoring. However, if the controller 120 detects a sufficient change in the electrical characteristics of the elongated conductor, the method may proceed to block 515.

At block 515, the controller 120 may generate a signal, such as the signal 204, indicating damage to the lightguide 125 in response to detecting sufficient change in one or more electrical characteristics of the elongated conductor 130. As described above, such a signal may operate to deactivate the light source 118 of the display system 100 in some embodiments, as shown at block 520, cause the display system 100 to display an error message in some embodiments, as shown at block 525, play an alert sound in some embodiments, as shown at block 530, and/or otherwise apprise the user of possible damage to the lightguide 125. As also described above, the controller 120 may take progressive steps to prevent discomfort to a user's eye, such as displaying an error message on the display system 100 after detecting a slight change in one or more electrical characteristics and only deactivating the light source 118 after detecting moderate to severe changes in the one or more electrical characteristics, or a combination thereof. As described above, in some embodiments, after the controller 120 generates a signal indicating that the lightguide 125 has been damaged, the method may return to block 505 to continue monitoring.

In some embodiments, a head mounted display (HMD) device of the present disclosure comprises: a frame housing a light source to project display light; a lightguide configured to receive the display light from the light source, the lightguide having an incoupler; an elongated conductor disposed at the lightguide proximal to the incoupler; and a controller coupled to the elongated conductor and configured to: monitor the elongated conductor for a change in an electrical characteristic of the elongated conductor; and generate a signal indicating that the lightguide has been damaged in response to detecting the change in the electrical characteristic of the conductor. In some embodiments, the elongated conductor is an antenna; and the HMD further comprises a radio frequency (RF) interface to control the antenna. In some embodiments, the electrical characteristic of the elongated conductor comprises a gain of the antenna. In some embodiments, the elongated conductor comprises a monopole antenna. In some embodiments, the change in the electrical characteristic is a change in impedance. In some embodiments, the elongated conductor is implemented as a loop. In some embodiments, the change in the electrical characteristic is a change in connectivity. In some embodiments, the lightguide further comprises an exit-pupil expander disposed proximal the elongated conductor. In some embodiments, the elongated conductor extends along an outer periphery of the lightguide from a location proximal the incoupler to a location proximal the exit-pupil expander. In some embodiments, the elongated conductor is applied to the lightguide using lithography. In some embodiments, the elongated conductor is applied to the lightguide using plating deposition. In some embodiments, the light source is configured to be deactivated in response to the signal. In some embodiments, the elongated conductor is substantially transparent.

In some embodiments, monitoring the elongated conductor further includes monitoring the elongated conductor for one or more changes in a plurality of electrical characteristics of the elongated conductor, and wherein generating a signal further includes generating a signal indicating that the lightguide has been damaged in response to detecting the one or more changes in the plurality of electrical characteristics of the conductor. In some embodiments, generating a signal further includes generating a signal indicating that the lightguide has been damaged in response to detecting two or more changes in the plurality of electrical characteristics of the conductor when the two or more changes satisfy one or more rules, equations, or algorithms. In some embodiments, generating a signal further includes generating a signal indicating that the lightguide has been damaged in response to determining that the change in the electrical characteristic of the conductor exceeds one or more predetermined thresholds or percentages. In some embodiments, the controller is configured to cause the light source to project an error message as display light in response to the signal. In some embodiments, the controller is configured to cause a speaker to produce a warning sound in response to the signal. In some embodiments, the elongated conductor is at least partially hidden from view by the frame.

In some embodiments, a method of the present disclosure comprises: monitoring an elongated conductor disposed proximal an incoupler in a lightguide of a head mounted display (HMD) for a change in an electrical characteristic, the HMD having a light source configured to project display light into the incoupler; and generating a signal indicating that the lightguide has been damaged when the change in the electrical characteristic of the conductor is detected. In some embodiments, the method further includes controlling the elongated conductor as an antenna with a radio frequency (RF) interface. In some embodiments, the electrical characteristic of the elongated conductor comprises a gain of the antenna. In some embodiments, the change in the electrical characteristic is a change in impedance. In some embodiments, the change in the electrical characteristic is a change in connectivity. In some embodiments, the method further includes deactivating the light source when the change in the electrical characteristic of the conductor is detected.

In some embodiments, monitoring the elongated conductor further includes monitoring the elongated conductor for one or more changes in a plurality of electrical characteristics of the elongated conductor, and wherein generating a signal further includes generating a signal indicating that the lightguide has been damaged in response to detecting the one or more changes in the plurality of electrical characteristics of the conductor. In some embodiments, generating a signal further includes generating a signal indicating that the lightguide has been damaged in response to detecting two or more changes in the plurality of electrical characteristics of the conductor when the two or more changes satisfy one or more rules, equations, or algorithms. In some embodiments, generating a signal further includes generating a signal indicating that the lightguide has been damaged in response to determining that the change in the electrical characteristic of the conductor exceeds one or more predetermined thresholds or percentages. In some embodiments, the method further comprises causing the light source to project an error message as display light in response to the signal. In some embodiments, the method further comprises causing a speaker to produce a warning sound in response to the signal. In some embodiments, the method further comprises causing the light source to project a predetermined color as display light in response to the signal.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head mounted display (HMD) device comprising:
a frame housing a light source to project display light;
a lightguide configured to receive the display light from the light source, the lightguide having an incoupler;
an antenna disposed at the lightguide proximal to the incoupler;
a radio frequency (RF) interface to control the antenna; and
a controller coupled to the antenna and configured to:
monitor the antenna for a change in an electrical characteristic of the antenna; and
generate a signal indicating that the lightguide has been damaged in response to detecting the change in the electrical characteristic of the antenna.

2. The HMD of claim 1, wherein the electrical characteristic of the antenna comprises a gain of the antenna.

3. The HMD of claim 1, wherein the antenna comprises a monopole antenna.

4. The HMD of claim 1, wherein the change in the electrical characteristic is a change in impedance.

5. The HMD of claim 1, wherein the antenna is implemented as a loop and the change in the electrical characteristic is a change in connectivity.

6. The HMD of claim 1, wherein the lightguide further comprises an exit-pupil expander disposed proximal the antenna and the antenna extends along an outer periphery of the lightguide from a location proximal the incoupler to a location proximal the exit-pupil expander.

7. The HMD of claim 1, wherein the light source is configured to be deactivated in response to the signal.

8. The HMD of claim 1, wherein monitoring the antenna further includes monitoring the antenna for one or more changes in a plurality of electrical characteristics of the antenna, and wherein generating a signal further includes generating a signal indicating that the lightguide has been damaged in response to detecting the one or more changes in the plurality of electrical characteristics of the antenna.

9. The HMD of claim 8, wherein generating a signal further includes generating a signal indicating that the lightguide has been damaged in response to detecting two or more changes in the plurality of electrical characteristics of the antenna when the two or more changes satisfy one or more rules, equations, or algorithms.

10. The HMD of claim 1, wherein generating a signal further includes generating a signal indicating that the lightguide has been damaged in response to determining that the change in the electrical characteristic of the antenna exceeds one or more predetermined thresholds or percentages.

11. The HMD of claim 1, wherein the controller is configured to cause the light source to project an error message as display light in response to the signal.

12. The HMD of claim 1, wherein the controller is configured to cause a speaker to produce a warning sound in response to the signal.

13. The HMD of claim 1, wherein the controller is configured to activate the RF interface to produce a damage notification in response to the signal.

14. A method, comprising:
monitoring an antenna disposed proximal an incoupler in a lightguide of a head mounted display (HMD) for a change in an electrical characteristic, the HMD having a light source configured to project display light into the incoupler;
controlling the antenna to one or both of transmit a radio frequency (RF) signal or receive a RF signal; and
generating a signal indicating that the lightguide has been damaged when the change in the electrical characteristic of the antenna is detected.

15. The method of claim 14, wherein:
monitoring the antenna further includes monitoring the antenna for one or more changes in a plurality of electrical characteristics of the antenna; and
generating a signal further includes generating a signal indicating that the lightguide has been damaged in response to detecting the one or more changes in the plurality of electrical characteristics of the antenna.

16. The method of claim 14, wherein generating a signal further includes generating a signal indicating that the lightguide has been damaged in response to detecting two or more changes in a plurality of electrical characteristics of the antenna when the two or more changes satisfy one or more rules, equations, or algorithms.

17. The method of claim 14, wherein generating a signal further includes generating a signal indicating that the lightguide has been damaged in response to determining that the change in the electrical characteristic of the antenna exceeds one or more predetermined thresholds or percentages.

18. The method of claim 14, further comprising:
projecting an error message as part of the display light in response to the signal.

19. The method of claim 14, further comprising:
causing a speaker to produce a warning sound in response to the signal.

20. The method of claim 14, further comprising:
transmitting an RF signal that provides a damage notification in response to the signal.

* * * * *